United States Patent [19]

Clemmer et al.

[11] 3,968,640

[45] July 13, 1976

[54] DIGITAL WATCH WITH ELASTOMER HOUSING BLOCK AND FLEXIBLE PRINTED CIRCUITRY

[75] Inventors: Paul J. Clemmer, Huntington Beach; Roger A. Burke, Laguna Beach, Calif.

[73] Assignee: Hughes Aircraft Company, Culver City, Calif.

[22] Filed: Sept. 16, 1974

[21] Appl. No.: 506,621

[52] U.S. Cl. ................................ 58/50 R; 58/23 R; 58/23 BA

[51] Int. Cl.² ........................................ C04B 19/34

[58] Field of Search ............ 58/23 R, 23 A, 23 BA, 58/50 R, 58; 200/266, 272; 174/117 FF

[56] References Cited

UNITED STATES PATENTS

| | | | |
|---|---|---|---|
| 3,624,325 | 11/1971 | Horn | 200/266 X |
| 3,778,999 | 12/1973 | Vuffray | 58/23 R |
| 3,784,725 | 1/1974 | Perkins et al. | 58/23 R X R |
| 3,800,525 | 4/1974 | Bergey | 58/50 R |
| 3,803,827 | 4/1974 | Roberts | 58/58 X |
| 3,838,568 | 10/1974 | Zurcher et al. | 58/23 RXR |
| 3,884,033 | 5/1975 | Wood | 58/23 R |

OTHER PUBLICATIONS

Malco Bulletin 705, 1970, 4 pp.

*Primary Examiner*—Ulysses Weldon
*Attorney, Agent, or Firm*—Fay I. Konzem; W. H. MacAllister

[57] ABSTRACT

A digital watch having an elastomer spacer block which houses the watch batteries, the oscillator crystal, and the substrate with its electronics and optical display elements mounted thereon; all in the same cavity. Said digital watch also has a flexible printed circuit which contacts the batteries and electrically connects them to the watch electronics. The flexible printed circuit is also used to turn on and to set the time by grounding the contact on the printed circuit to the case.

5 Claims, 9 Drawing Figures

Fig. 2.
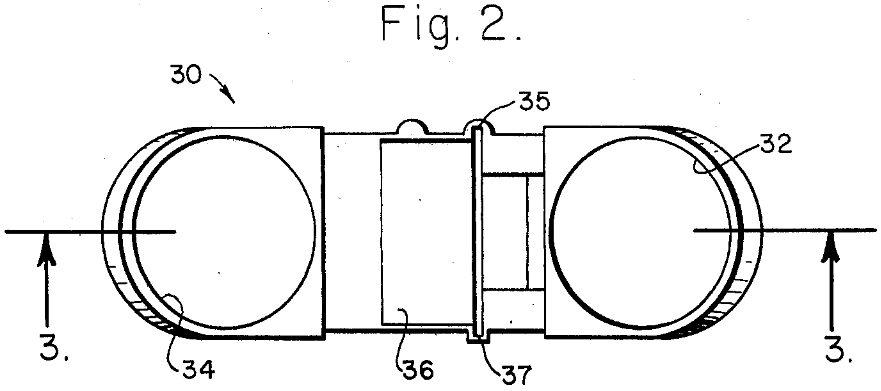
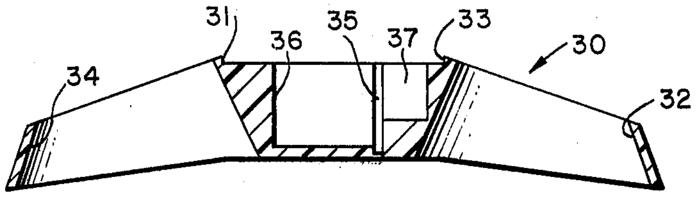
Fig. 3.
Fig. 4.
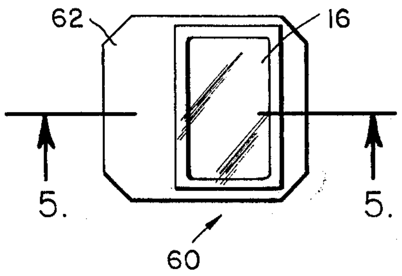
Fig. 5.
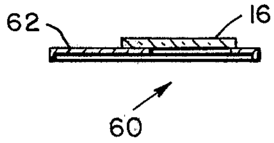
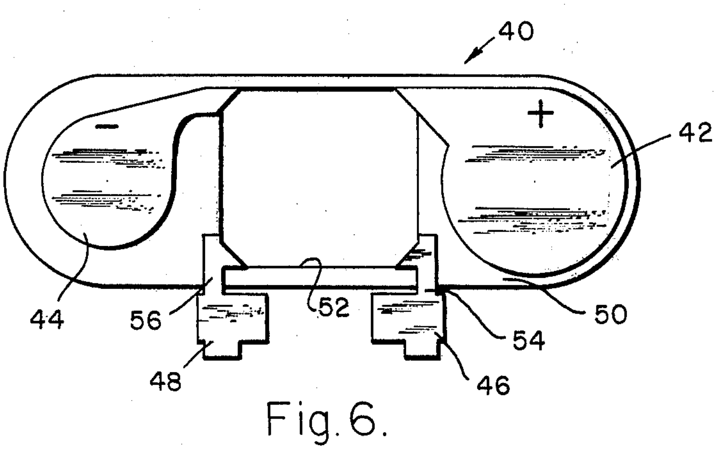
Fig. 6.

DIGITAL WATCH WITH ELASTOMER HOUSING BLOCK AND FLEXIBLE PRINTED CIRCUITRY

BACKGROUND OF THE INVENTION

1. Field of the Invention

This invention relates to the mechanical structure of a digital watch, and more particularly to a digital watch with an elastomer spacer block housing to watch components, and having a flexible cable used to make electrical connections.

2. Description of the Prior Art

In the art, digital watch mountings have employed a single spacer to isolate and support the batteries and electronics in the case of the digital watch. The structure of such a digital watch is disclosed in U.S. Pat. No. 3,838,568, entitled "Electronic Watch Movement Mounting and Connection." But said prior art digital watch structure needed to use springs to keep the substrate in position and to make electrical continuity between the push buttons and the electronic circuitry.

This advantage of the present invention over the prior art digital watch structure is that the springs have been eliminated. In place of the springs, the present invention uses an elastomer spacer to hold the batteries and the substrate in position. Also instead of using springs to make electrical connection between the push buttons and the electronic circuitry, the present invention uses a flexible printed circuit to make contact.

Such a watch mounting structure would be advantageous in constructing a small man's digital watch or in constructing a small lady's watch such as the two-digit digital watch as disclosed in Patent application Ser. No. 505,896, filed Sept. 13, 1974, entitled "Digital Timing Circuit for Display Sequencing in Two-Digital Wristwatch," by Norman E. Moyer.

SUMMARY OF THE INVENTION

The digital watch, in accordance with the invention, consists of a case, an oscillator crystal, an oscillator for generating time signals, electronic circuitry mounted on a substrate controlling a plurality of electro-optical display devices which display the time and a single elastomer spacer block which contains the watch oscillator crystal and substrate in the block's center portion and two batteries, each located in a hole on either side of the center portion of the block. The batteries and the push buttons are electrically connected to the electronic circuitry by means of a flexible printed circuit contact.

Accordingly, it is an object of this invention to provide a digital watch with a mounting structure which consists of a single elastomer spacer block containing the components of the digital watch and the watch batteries in combination with a flexible printed circuit contact connecting said batteries and the watch's push buttons to the watch's electronics.

The features of the present invention which are believed to be novel are set forth with particularity in the appended claims. The present invention, both as to its organization and manner of operation, together with further objects and advantages thereof, may be better understood by reference to the following description, taken in connection with the accompanying drawings.

BRIEF DESCRIPTION OF THE DRAWINGS

FIG. 2 is a top-plane view of the elastomer spacer block which holds the component parts of said digital watch.

FIG. 3 is a section through the spacer block taken along line 3—3 of FIG. 2.

FIG. 4 is a top view of the cover for the light emitting diode (LED) display elements.

FIG. 5 is a side view of the LED cover and window of FIG. 4.

FIG. 6 is a top view of the flexible cable which electrically connects the batteries and the push buttons to the digital watch electronics.

DETAILED DESCRIPTION

Figure 1:
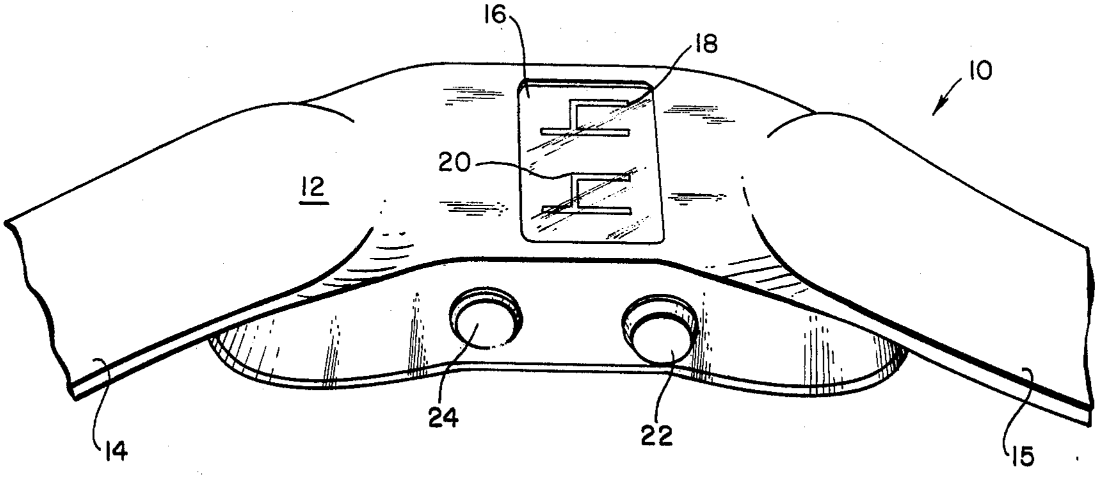
FIG. 1 is a perspective view of a two-digit digital watch with a single elastomer spacer block and a flexible printed circuit, in accordance with the present invention.

Referring now to FIG. 1, the digital watch 10 has a case 12 which is provided with watch securing straps 14 and 15. Digital watch 10 also includes an oscillator crystal powered by two batteries and electronic circuitry with a suitable frequency divider and memory so that a signal corresponding to the present time in hours and minutes is stored and updated. The two LED's 18 and 20 can be viewed through a clear window 16. The LED display elements 18 and 20 are blank until the electronics of the digital watch are activated by depressing push button 22. When said push button is depressed the two display elements first display hours information, next are blank for a short duration, and then display the minutes information, in a sequencing fashion. This allows both the hours and minutes information to be displayed by the use of only two LED's.

When recessed push button 24 is depressed by using a sharp implement, the hours information can thereby be changed or reset. To change the minutes information both push buttons 22 and 24 must be depressed. A more detailed description of the operation of said two-digit digital watch is disclosed in patent application Ser. No. 505,896, filed Sept. 13, 1974, entitled, "Digital Timing Circuit for Digital Sequencing in Two-Digit Wristwatch." The subject matter of this cross-reference is incorporated herein in its entirety. Said patent application is assigned to the same assignee as the present patent application, Hughes Aircraft Company.

Referring now to FIG. 2, the spacer block 30 consists of an elastomer material and supports all the component parts of said digital watch. Block 30 has two circular holes 32 and 34, which each support a battery.

Spacer block 30 also has a recess 36 which receives the oscillator crystal and the substrate containing the watch's electronic circuitry and LED displays. The substrate is situated above said oscillator crystal, lying on top of spacer block 30.

Shoulders 35 and 37 of spacer block 30 are needed so that recess 36 will conform to the shape of the oscillator crystal, which has a lip around its base, which will fit in shoulders 35 and 37.

Figure 9:
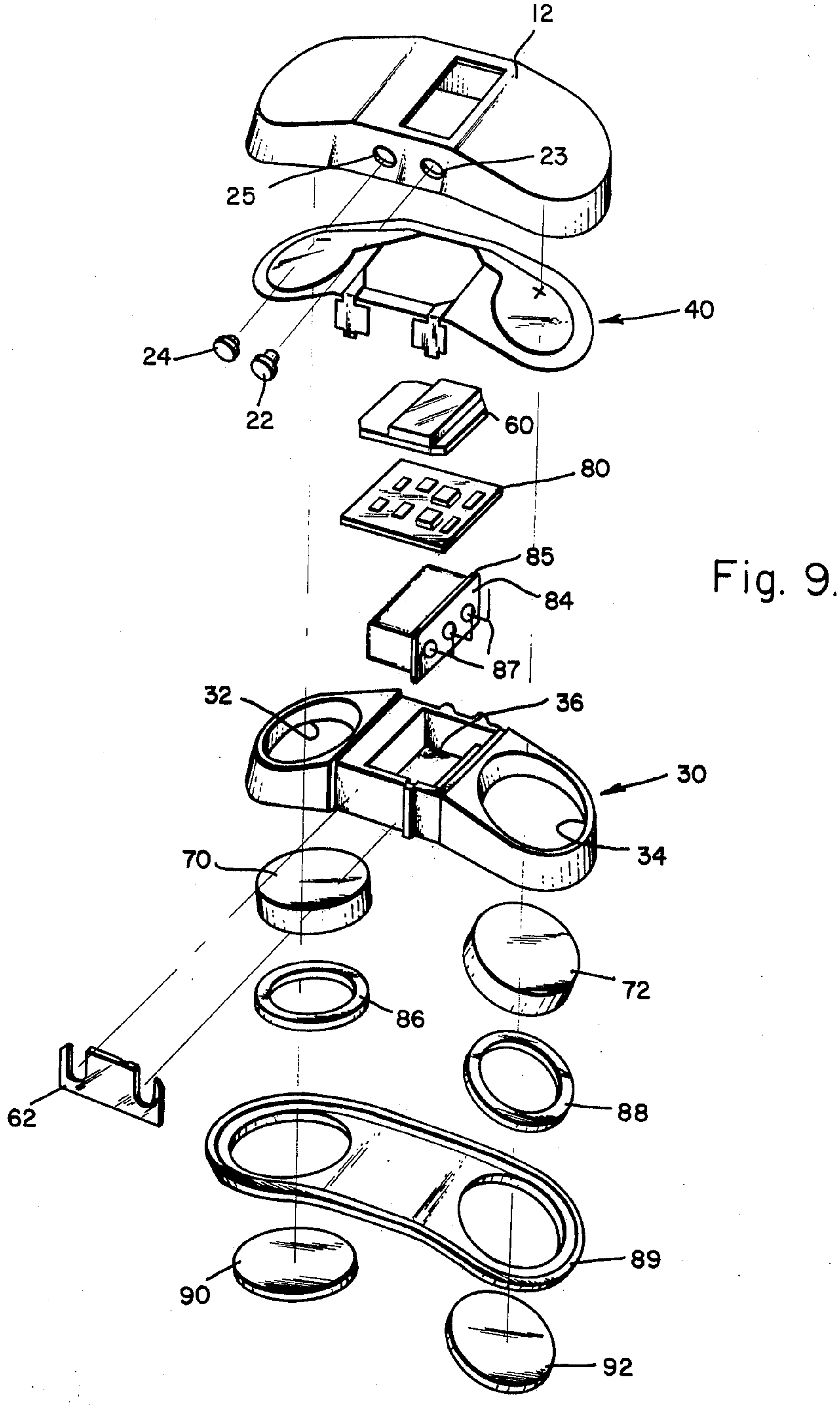
FIG. 9 is an exploded view of the component parts of the digital watch of the present invention.

FIG. 3 is a section through the spacer block 30 along line 3—3 of FIG. 2, showing the recess 36 and holes 32 and 34. Flanges 31 and 33 hold the substrate 80 of FIG. 9 in position. Oscillator crystal 84 of FIG. 9 is placed in recess 36; the can or main portion of the crystal is placed in recess 36, the protruding rim 85 of the crystal is situated in recess 35 and the leads 87 from the crystal connecting it to the electronic circuitry are positioned in recess 37.

Referring to FIG. 4, cover 60, which covers the LED's and the watch's electronics consists of a brass material 62 painted with dull black paint and a clear plastic window 16, through which the LED displays can be viewed. Said cover 60 has a liquid tight seal to protect the digital watch's electronics and display elements from any harmful liquid.

FIG. 5 is a side view of the cover 60 of FIG. 4, showing the brass base 62 and the plastic window 16.

FIG. 6 shows the flexible printed circuit contacts connecting the batteries and the push buttons to the digital watch electronics on the watch substrate. Flexible printed circuit 40 consists of 0.002 inch beryllium-copper material at positions 42, 44, 46, and 48 which is applied to a 0.002 inch base layer of Kapton. Kapton is a polyamide material manufactured by Dupont.

The beryllium-copper material at 42 is placed in contact with the positive side of a first battery and the beryllium-copper material at 44 is placed in contact with the negative side of a second battery. Said contacts electrically connect said batteries to the watch electronics mounted on the watch substrate, and placed in opening 52.

The beryllium-copper material at 42 and 44 make contact with the batteries so as to electrically connect said batteries to the watch electronics mounted on the substrate, and placed in opening 52.

Beryllium-copper elements 46 and 48 are folded at a 90° angle at points 54 and 56 to connect the watch electronics to push buttons 22 and 24, respectively. When push button 22 is depressed, its shaft travels until it touches contact 46 of flexible printed circuit 40, thus grounding contact 46 through the push button shaft to the watch case 12 and thereby activating the display devices 18 and 20 to display the time.

Likewise, when recessed push button 24 is depressed by using a sharp implement, the push button's shaft travels until it touches contact 48 of flexible printed circuit 40, thus grounding contact 48 through the push button shaft to the case 12 and thereby resetting the hours information.

Finally, the minutes information is reset by depressing both push puttons 22 and 24 simultaneously, thereby grounding both contacts 46 and 48 to the case.

Figure 7:
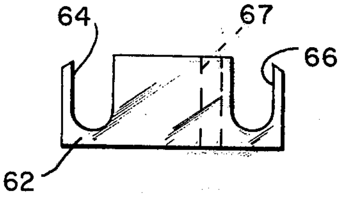
FIG. 7 is a side view of the plastic spacer which holds the push buttons in place.

FIG. 7 shows push button spacer 62, which is attached to the side of the elastomer block 30. Said spacer 62 is made of an anti-static plastic. Push buttons 22 and 24 are held in position and controlled by openings 64 and 66 respectively, of said spacer. Spacer 62 is located between the watch case 12 and the flexible contacts 46 and 48. Push buttons 22 and 24, when depressed make electrical contact with contacts 46 and 48, which in turn activate the electronic circuitry. Recess 67 allows for the shoulder 37 (see FIG. 2) of the spacer block 30, so that spacer 62 can fit tightly against the side of spacer block 30.

Figure 8:
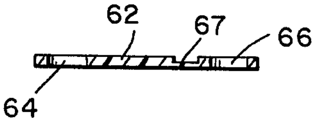
FIG. 8 is a top view of the plastic spacer of FIG. 7.

FIG. 8 is a top view of the push button spacer 62 of FIG. 7. U-shaped openings 64 and 66, where the push buttons are placed and recess 67 are illustrated.

FIG. 9 shows an exploded view of the component parts of the digital watch of the present invention and how they are assembled. Into digital watch case 12, is first placed the flexible cable 40, the push buttons 22 and 24, followed by electronic and display element cover 60, followed by the substrate and electronics 80, next followed by oscillator crystal 84.

Oscillator crystal 84 rests on the recess and bottom layer 36 of elastomer block 30. And push buttons 22 and 24 are inserted in holes 23 and 25 on case 12. Next the batteries 70 and 72 are positioned in the elastomer spacer block openings 32 and 34 and sealing rings 86 and 88 are positioned on the bottom of said batteries. The watch case bottom 89 is placed on the bottom side of case 12, and battery hatch covers 90 and 92 are engaged upon the bottom of batteries 70 and 72 respectively, to thrust said batteries upward.

In summary, the present invention consists of a digital watch with an elastomer housing for isolating and supporting the watch's batteries and electronics and a flexible printed cable connecting the batteries and the push buttons to the watch's electronics, thus eliminating the need for metal springs to hold the substrate in place and to make electrical connections.

Although the device which has just been described appears to afford the greatest advantages for implementing the invention, it will be understood that various modifications can be made thereto without going beyond the scope of the invention, it being possible to replace certain elements by other elements capable of fulfilling the same technical function therein.

What is claimed is:

1. A digital watch having a case and a substrate on which electronic circuitry and electro-optical display devices are situated, a spacer block for supporting said substrate and for positioning and isolating at least one battery, the improvement comprising:

at least one push button for activating said display devices;

a flexible circuit with at least one contact for providing electrical continuity between said push buttons and said electronic circuitry and between said batteries and said electronic circuitry; and an elastomeric spacer for supporting the substrate, isolating the batteries, and acting as a spring to return the contacts of said flexible circuit to their uncontacted position after the push buttons have been depressed.

2. A digital watch as recited in claim 1, wherein said contacts on said flexible printed circuit consist of a thin layer of beryllium-copper which is applied to a thin layer of Kapton, said beryllium-copper contact electrically connecting said battery to said electronic circuitry.

3. A digital watch having a case and a substrate on which electronic circuitry and electro-optical display devices are situated, a spacer block for supporting said substrate and for positioning and isolating at least one battery, at least one push button for activating said display devices, the improvement comprising:

said spacer block formed in a substantially rectangular shape and having a center portion and first and second end portions;

said block having a recess for supporting said substrate, located in the center portion;

said block also having two holes, one located in the first end portion and the second hole located in the second end portion;

a battery situated in each hole for energizing said display devices and said electronic circuitry; and said spacer block consists of a molded elastomer material, making said digital watch shock proof and wherein said single spacer block supports an isolates all of the digital watch components, said spacer block acts as a stop for said push button and acts as a spring to return said push button to its original position after it has been depressed.

4. A digital watch having a case, a crystal mounted on the top of said case, an oscillator for generating time signals, electronic circuitry mounted on a substrate for controlling a plurality of electro-optical display devices which display the time, wherein the improvement comprises:

a spacer block formed in a substantially rectangular shape and having a center portion and first and second end portions;

said block having a recess for supporting said oscillator and said substrate, located in the center portion;

said block also having two holes, one located in the first end portion and the second hole located in the second end portion;

a battery situated in each hole for energizing said display devices and said electronic circuitry;

a plurality of push buttons for activating the display devices and setting the time;

a flexible electrically conductive cable connecting said batteries and said push buttons to said electronic circuitry; and wherein said single spacer block supports and isolates all of the digital watch components, said spacer block acts as a stop for said push buttons and acts as a spring to return said push buttons to their original position after they have been depressed.

5. A digital watch as recited in claim 4, wherein said spacer block consists of a molded elastomer material, making said digital watch shock proof.

* * * * *